April 27, 1948.　　　　K. I. POSTEL　　　　2,440,614
POWER TRANSMISSION
Filed Feb. 9, 1946
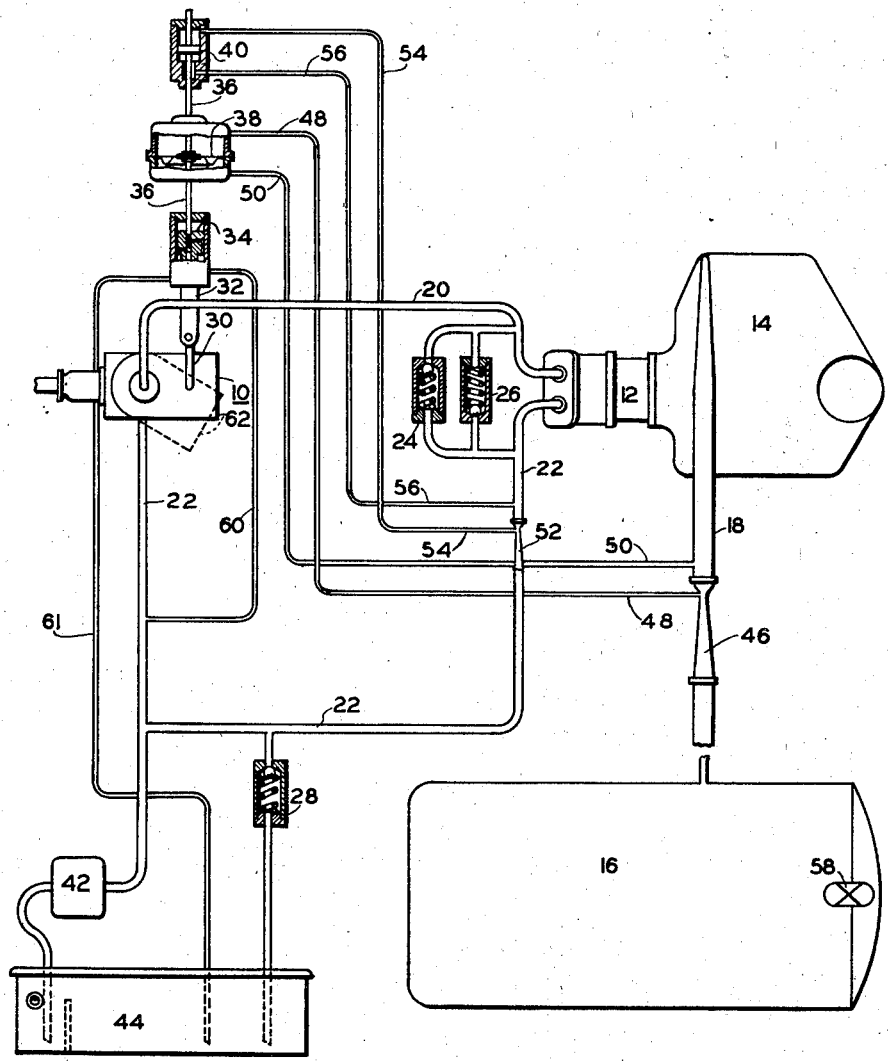
INVENTOR.
KENNETH I. POSTEL
BY
Ralph L. Tweedale
ATTORNEY Patented Apr. 27, 1948

2,440,614

UNITED STATES PATENT OFFICE 2,440,614

POWER TRANSMISSION

Kenneth I. Postel, Detroit, Mich., assignor to Vickers Incorporated, Detroit, Mich., a corporation of Michigan Application February 9, 1946, Serial No. 646,576

10 Claims. (Cl. 230—11)

This invention relates to hydraulic power transmissions and control systems and especially to transmissions employed for driving air compressors.

The proposed system is especially designed for supplying a variable volume of air to a pressure enclosure maintained at a fixed pressure. A particular application of such use is the supercharging of a plane cabin in modern aircraft.

Compressors for supercharging plane cabins are subject to varying loads of an extreme nature. The intake pressure is variable due to the change in atmospheric pressure at various flying altitudes. At higher altitudes the air density is greatly reduced thereby further complicating the control and increasing the load on the compressor or blower. Leakage from the pressure enclosure or plane cabin also increases at higher altitudes due to the higher differential in internal and external pressure.

Due to the extreme loads and sudden changes in demand which may be imposed on such a system the blower, or prime mover, or transmission or all three, may be injured. An accidental loss of air from the pressure enclosure may impose excessive speeds on the transmission and blower.

The general object of this invention is to provide a suitable hydraulic transmission for driving a blower efficiently under the extreme variation in load demands required for supercharging plane cabins. A further object is to provide an air flow blower delivery control for preventing excess blower speeds by regulating or varying the hydraulic pump capacity and transmission speeds.

Another object of this invention is to provide a hydraulic fluid flow control also adapted to control the pump capacity and prevent excessive transmission speeds. It is also an object of the proposed control system, that both the air flow blower delivery control and the hydraulic fluid flow or transmission speed control may work independently or cooperatively without interference between their separate functions.

Further objects and advantages of the present invention will be apparent from the following description, reference being had to the accompanying drawing wherein a preferred form of the present invention is clearly shown.

In the drawing:

The drawing is a diagrammatic view of a hydraulic power transmission and control system incorporating a preferred form of the present invention.

In detail the hydraulic transmission comprises a variable displacement pump 10 and a hydraulic motor 12 adapted to drive a blower 14. The blower 14 is connected to a plane cabin or pressure enclosure 16 by an air pressure conduit 18. A closed type hydraulic circuit is employed and connects pump 10 to the hydraulic motor 12 by means of a pressure conduit 20 and a return conduit 22. Conventional relief valves 24 and 26 are disposed across the ports of the motor.

The pump 10 is of the variable displacement, multiple-piston, design employing a swinging yoke to vary the piston stroke. The position of the swinging yoke is controlled by a link 30 which is attached to a rod 32 of servo-motor 34. A rod 36 connects the control valve of the servo-motor 34 to an air-actuated, control diaphragm 38 and a fluid-actuated hydraulic speed control piston 40. The hydraulic servo circuit and the hydraulic transmission circuit are maintained at operating pressure by means of a replenishing pump 42 in combination with a relief valve 28 connected to tank 44 from the return hydraulic conduit 22.

An air flow venturi 46 is located in the air pressure conduit 18. The function of the air flow venturi 46 is to control the operation of the air-actuated, control diaphragm 38 which in turn controls the servo-piston 34 and yoke 62 of pump 10. An air conduit 48 extends from the Venturi throat to the upper side of the air diaphragm 38. An air conduit 50 extends from the air pressure conduit 18 to the lower side of the diaphragm 38. Therefore, any change in the rate of air flow in conduit 18 or displacement of blower 14 will immediately be transmitted to diaphragm 38 for controlling the pump 10.

A hydraulic flow venturi 52 is located in the return conduit 22 of the hydraulic circuit. A hydraulic conduit 54 extends from the throat of the hydraulic flow venturi 52 to the upper side of the hydraulic speed control piston 40. A hydraulic conduit 56 extends from the return line 22 of the transmission circuit to the lower side of the over speed control piston 40. Since the over speed control piston 40 is linked to the servo 34 by means of the rod 36, any variation in the hydraulic fluid flow of the transmission is immediately communicated to the control piston 40 for actuating the yoke of the pump 10 and changing the transmission speed as required.

In operation, the pump 10 driven by a prime mover, not shown, delivers hydraulic pressure fluid through the conduit 20 to the motor 12. The hydraulic motor 12 drives the blower 14 which delivers air under pressure through the conduit 18 to the pressure enclosure or plane cabin 16. Normally the air changes and pressure maintenance in the cabin 16 are controlled by the self-operating pressure valve 58. If for any reason a leak occurs in the pressure cabin 16 or in the conduit 18, an increased demand is imposed upon the blower 14 and excessive speed may result.

In order to prevent excessive speed of the blower 14, air flow venturi 46 in combination with diaphragm 38 are provided for controlling the speed of the hydraulic transmission. As the speed of the blower 14 increases the air flow or volumetric delivery of the blower 14 increases through the venturi 46 and causes the diaphragm 38, illustrated in the drawing, to rise. Any movement of the diaphragm 38 is carried through the rod 36 which in turn actuates the servo valve and controls the movement of the servo-motor 34. Hydraulic power for actuating the servo-motor 34 is supplied by a pressure conduit 60 and an exhaust conduit 61 connected to tank. Therefore, when the flow through venturi 46 is above normal the diaphragm 38 is raised thus swinging the yoke 62 of the pump 10 in a counterclockwise direction toward a neutral or axial line of the pump 10. In the reverse manner, as the air flow is decreased the pump yoke 62 will be thrown off center thus increasing the hydraulic transmission speed and the speed of the blower.

As described above, the hydraulic transmission speed is controlled by the gravimetric delivery of the blower 14. However, assuming that the blower 14 may fail to deliver the necessary air volume at higher speed, then the air flow control through the venturi 46 will not function and excess hydraulic transmission speeds may result. In that case a secondary control or hydraulic means is provided for limiting the speed of the transmission. As the rate of flow of hydraulic fluid through the return line 22 and hydraulic venturi 52 increases, the control piston 40 will be raised. Therefore, the yoke 62 is swung in a counterclockwise direction toward its neutral position in the same manner, but either in cooperation with or independent of the movement of control diaphragm 38 as described in the preceding paragraph.

Therefore, it is evident that the hydraulic transmission speed may be controlled either by the blower volume delivery or the hydraulic fluid flow in said transmission. Either control will work independently or both may work in cooperation to produce the same result.

It will thus be seen by a study of the above description and accompanying drawing that the improvement in hydraulic power transmissions and control systems will increase the reliability and safety of airplanes equipped with supercharged cabins. In other words, the proposed device will not only raise the efficiency of a supercharging system but will keep it operating within safe limits and prevent total breakdown of the system as a result of overload or excess speed.

While the form of embodiment of the invention as herein disclosed constitutes a preferred form, it is to be understood that other forms might be adopted, all coming within the scope of the claims which follow.

What is claimed is as follows:

1. A hydraulic transmission drive and control system comprising a variable delivery pump driven by a prime mover, a hydraulic motor, a blower driven by said hydraulic motor, pneumatic means actuated by the blower for controlling the pump delivery and hydraulic power transmitted to said blower, in combination with hydraulic means actuated by the rate of flow of hydraulic fluid in the hydraulic transmission for controlling the pump delivery and hydraulic power transmitted to said blower.

2. A hydraulic transmission drive and control system comprising a variable delivery pump driven by a prime mover, a hydraulic motor, a blower driven by said hydraulic motor, pneumatic means actuated by the air flow rate from the blower for controlling the pump speed and in turn the blower speed, a hydraulic flow venturi in the hydraulic transmission circuit, a cylinder provided with a double acting piston linked to said pump, and conduits connecting the throat of the hydraulic flow venturi and the transmission circuit respectively to opposite sides of the double acting piston for controlling the hydraulic transmission speed.

3. A hydraulic transmission and control system for supercharging a plane cabin comprising a blower, a pressure conduit for delivering air under pressure from the blower to said cabin, a hydraulic transmission including a variable delivery pump for transmitting power from a prime mover to said blower and driving the same, a servo cylinder for varying the pump delivery, and pneumatic means responsive to the air flow rate from the blower in combination with hydraulic means responsive to the fluid flow rate in the hydraulic transmission circuit for actuating said linkage and cooperatively or independently controlling the speed of the hydraulic transmission and blower.

4. A hydraulic transmission and control system for supercharging a plane cabin comprising a blower, a pressure conduit for delivering air under pressure from the blower to said cabin, a hydraulic transmission including a variable delivery pump for transmitting power from a prime mover to said blower and driving the same, a servo cylinder for varying the pump delivery, and pneumatic means responsive to the air flow rate from the blower in combination with hydraulic means, including a hydraulic fluid flow venturi in the hydraulic transmission circuit, a cylinder and double acting piston linked to said servo, fluid conduits connecting the hydraulic transmission circuit and Venturi throat respectively to opposite ends of said double acting piston for operating said piston, and cooperatively or independently controlling the speed of the hydraulic transmission and blower.

5. A hydraulic transmission and control system for supercharging a plane cabin comprising a blower, a pressure conduit for delivering air under pressure from the blower to said cabin, a hydraulic transmission including a variable delivery pump for transmitting power from a prime mover to said blower and driving the same, a servo cylinder for varying the pump delivery, and pneumatic means responsive to the air flow rate from the blower including an air flow venturi in the pressure conduit connecting the blower to the cabin, a pneumatic control diaphragm linked to said servo, air conduits connecting the discharge pressure conduit from the blower and the air flow Venturi throat respectively to opposite ends of the pneumatic control diaphragm, in combination with hydraulic means responsive to the fluid flow rate in the hydraulic transmission circuit for actuating said linkage and cooperatively or independently controlling the speed of the hydraulic transmission and blower.

6. A hydraulic transmission and control system for supercharging a plane cabin comprising a blower, a pressure conduit for delivering air under pressure from the blower to said cabin, a hydraulic transmission including a variable delivery pump for transmitting power from a prime mover to said blower and driving the same, a servo cylinder for varying the pump delivery, and pneumatic means responsive to the air flow rate from the blower including an air flow venturi in the pressure conduit connecting the blower to the cabin, a pneumatic control diaphragm linked to said servo, air conduits connecting the discharge pressure conduit from the blower and the air flow Venturi throat respectively to opposite ends of the pneumatic control diaphragm, in combination with hydraulic means including a hydraulic fluid flow venturi in the hydraulic transmission circuit, a cylinder and double acting piston linked to said servo, fluid conduits connecting the hydraulic transmission circuit and Venturi throat respectively to opposite ends of said double acting piston for operating said piston, and cooperatively or independently controlling the speed of the hydraulic transmission and blower.

7. A hydraulic drive and control system for operating a compressor comprising in combination a prime mover, a variable speed hydraulic transmission between the prime mover and the compressor and including a pump and fluid motor, means shiftable to vary the speed ratio of the transmission, a first controller responsive to the operating conditions of the compressor for shifting said means, and a second controller responsive to fluid flow rate through the motor for shifting said means to limit overspeeding of the transmission under the influence of the first controller.

8. In combination a prime mover, a variable speed transmission, and including a pump and fluid motor, a compressor driven thereby, means responsive to operating conditions of the compressor for normally governing the transmission, and means responsive to the fluid flow rate through the motor for limiting overspeeding thereof under the influence of the first governing means.

9. A hydraulic transmission and control system for an air compressor required to deliver variable volumes of air at a fixed pressure, comprising a variable delivery pump, an air control actuated by the variation in volumetric delivery of the compressor and operable to reduce or decrease the pump delivery in proportion to the volumetric delivery, and a hydraulic control actuated by the variation in the rate of pressure fluid flow in the transmission to reduce or decrease the pump delivery in proportion to the pressure fluid flow rate, the air control and hydraulic control being so linked as to provide concerted operation, or for independent operation and control by either when the other control is not functioning.

10. A hydraulic transmission and control system for an air compressor required to deliver variable volumes of air at a fixed pressure, comprising a variable delivery pump, an air control actuated by the variation in volumetric delivery of the compressor and operable to reduce or decrease the pump delivery in proportion to the volumetric delivery, and a hydraulic control actuated by the variation in the rate of pressure fluid flow in the transmission to reduce or decrease the pump delivery in proportion to the pressure fluid flow rate, the air and hydraulic controls being so designed and interconnected whereby concerted operation is normally provided without preventing independent operation by either control when the other is not functioning.

KENNETH I. POSTEL.

REFERENCES CITED

The following references are of record in the file of this patent:

UNITED STATES PATENTS

| Number | Name | Date |
| --- | --- | --- |
| 1,508,707 | Moss | Sept. 16, 1924 |
| 2,283,644 | Nallinger | May 19, 1942 |
| 2,353,201 | Talbot | July 11, 1944 |
| 2,376,199 | Shoults | May 15, 1945 |
| 2,377,199 | Adams et al. | May 29, 1945 |
| 2,390,487 | Lawrence et al. | Dec. 4, 1945 |
| 2,393,172 | Larrecq | Jan. 15, 1946 |